US006461122B1

(12) United States Patent  
Huang

(10) Patent No.: US 6,461,122 B1
(45) Date of Patent: Oct. 8, 2002

(54) WATER CIRCULATION PUMP FOR AN AQUARIUM

(76) Inventor: Yi-Chung Huang, No. 32, Alley 12, Lane 85, Chung-hwa W. St., Yungkang City, Tainan Hsien (TW)

( * ) Notice: Subject to any disclaimer, the term of this patent is extended or adjusted under 35 U.S.C. 154(b) by 164 days.

(21) Appl. No.: 09/694,336

(22) Filed: Oct. 24, 2000

(51) Int. Cl.[7] ................................................. F04B 17/00
(52) U.S. Cl. ..................... 417/423.1; 417/313; 446/267; 119/253
(58) Field of Search ............................. 417/423.1, 313; 446/267; 119/253, 254, 255, 256

(56) References Cited

U.S. PATENT DOCUMENTS 5,727,933 A * 3/1998 Laskaris et al. ............... 418/2
6,062,827 A * 5/2000 Shu ............................. 417/310

* cited by examiner

Primary Examiner—Charles G. Freay
Assistant Examiner—W. Rodriquez
(74) Attorney, Agent, or Firm—Rosenberg, Klein & Lee

(57) ABSTRACT

A water circulation pump for an aquarium includes a shaft centrally engaged to the impeller. The free end of the shaft includes a pinion securely mounted to drive a reduction device. The reduction device includes a gear set having a final output gear that has an output shaft mounted to provide an extra power source. For example, the output shaft can drive a decorative device to make the aquarium looking more vivid and vigorous.

1 Claim, 4 Drawing Sheets

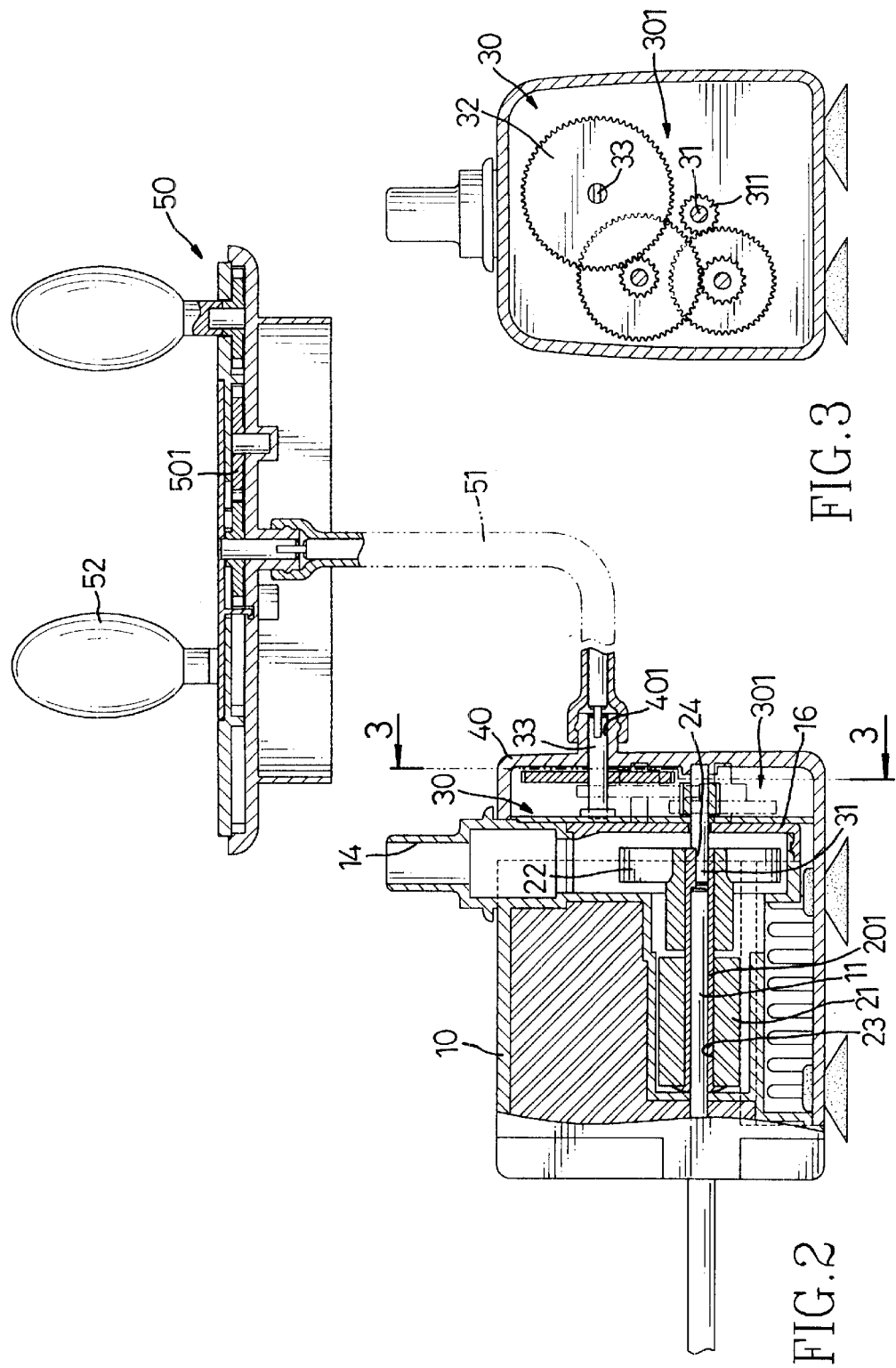

WATER CIRCULATION PUMP FOR AN AQUARIUM

BACKGROUND OF THE INVENTION

1. Field of the Invention

The present invention relates to a water circulation pump, and more particularly to a water circulation pump for an aquarium. The water circulation pump for an aquarium in accordance with the present invention provides a source of power to drive a decorative device to make the aquarium looking more vivid and vigorous.

2. Description of Related Art

With reference to FIGS. 4 and 5, a conventional water circulation pump for an aquarium in accordance with the prior art comprises a first casing (50) and a stator device (not numbered) mounted in the first casing (50). The first casing (50) includes a first side having a positioning shaft (51) horizontally extending therefrom and a second side having a through hole (52) defined therein. A flange (53) extends out from the second side of the casing (50) around the through hole (52) and forms a pump cavity (530) within the flange (53). An outlet (54) is defined in the outer periphery of the first casing (50) and communicates with the pump cavity (530). An inlet (55) is defined in the outer periphery of the first casing (50) and communicates with the inside of the first casing (50).

A rotor (60) is mounted in the first casing (50). The rotor (60) comprises a sleeve (601), a magnetic shaft (61) and an impeller (62). The magnetic shaft (61) has a longitudinal hole (63) centrally defined therein and is securely pressed onto the sleeve (511). The impeller (62) is also securely pressed onto the sleeve (511) so that when the magnetic shaft (61) rotates, the impeller (62) will rotate. The sleeve (511) is slid onto the positioning shaft (51), and the impeller is in the pump cavity (530) of the first casing (50).

The first casing (50) further includes a cover (56) attached to the flange (53) to close the pump cavity (530) and form a water channel from the inlet (55) to the outlet (54) via the pump cavity (530). A second casing (70) is attached to the first casing (50) to securely hold the cover (56) in place. The second casing (70) has multiple suction cups (71) attached to the bottom of the second casing (70) to securely mount the water circulation pump on the aquarium.

Water is sucked into the pump cavity (530) and injected into the aquarium from the outlet (54) by the impeller (62) of the rotor (60) to form a water current in the aquarium when the rotor (60) rotates. The conventional water circulation pump for an aquarium in accordance with the prior art only pumps water into the aquarium to form a water current. Other functions must be performed by other pieces of equipment in an aquarium.

The present invention has arisen to mitigate and/or obviate the disadvantages of the conventional water circulation pump for an aquarium.

SUMMARY OF THE INVENTION

In accordance with one aspect of the present invention, a water circulation pump for an aquarium includes a shaft engaged to the impeller rotor assembly. A pinion is securely mounted on the free end of the shaft to drive a reduction device. An output shaft is attached to a final output gear of the reduction device to provide a source of power to drive another device. For example, the output shaft can drive a decorative device to make the aquarium looking more vivid and vigorous.

Further benefits and advantages of the present invention will become apparent after a careful reading of the detailed description with appropriate reference to the accompanying drawings.

BRIEF DESCRIPTION OF THE DRAWINGS

FIG. 2 is a cross-sectional side plan view of the water circulation pump for an aquarium in FIG. 1;

FIG. 3 is a cross sectional front plan view of the reduction device along line 3—3 in FIG. 2;

DETAILED DESCRIPTION OF THE INVENTION

Figure 1:
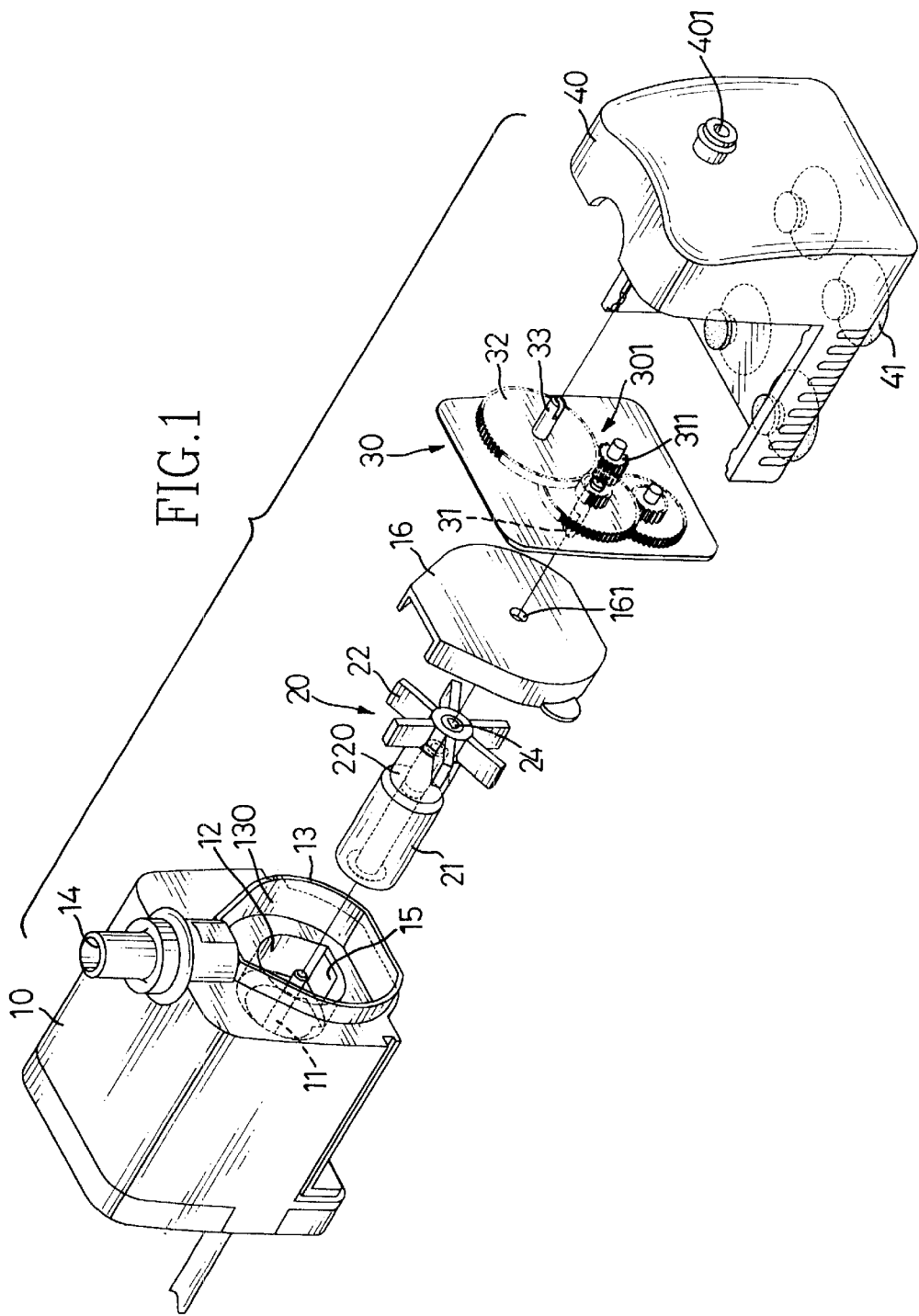
FIG. 1 is an exploded perspective view of a water circulation pump for an aquarium in accordance with the present invention.
Figure 4:
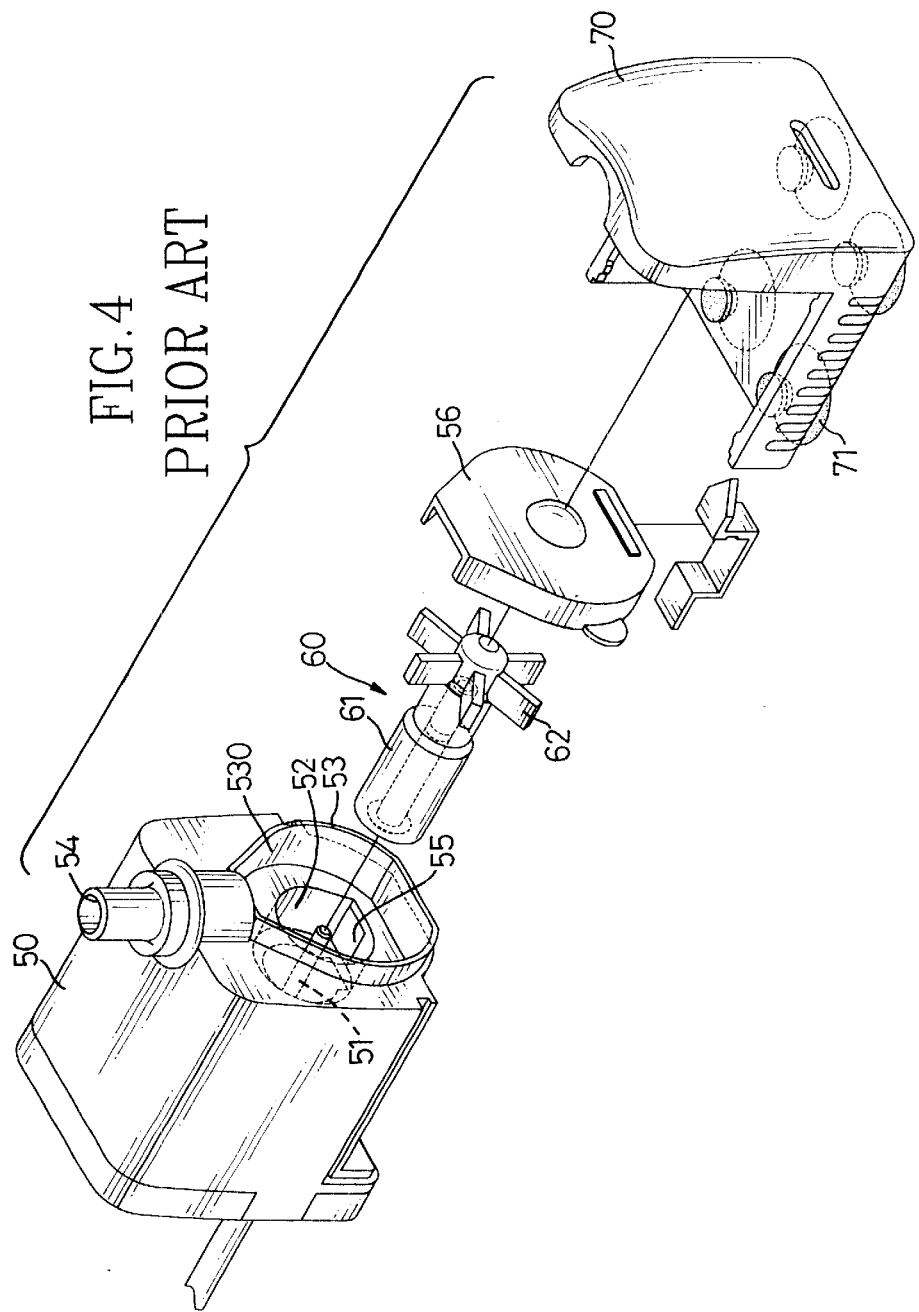
FIG. 4 is an exploded perspective view of a conventional water circulation pump for an aquarium in accordance with the prior art.
Figure 5:
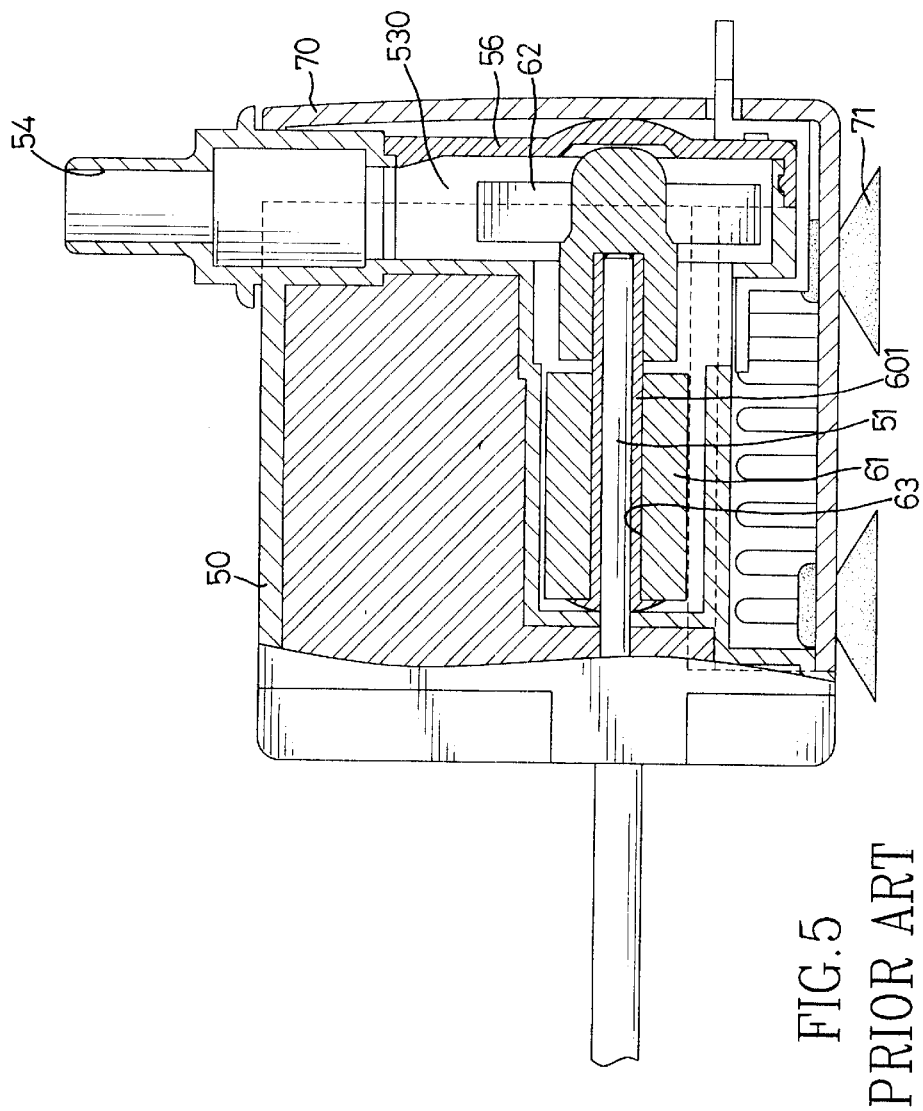
FIG. 5 is a cross-sectional side plan view of the water circulation pump for an aquarium in FIG. 4.

With reference to the FIGS. 1 to 3, a water circulation pump for an aquarium in accordance with the present invention comprises a first casing (10) and a stator device (not numbered) mounted in the first casing (10). The first casing (10) includes a first side having a positioning shaft (11) extending horizontally therefrom and a second side having a through hole (12) defined therein. A flange (13) extends out from the second side of the casing (10) around the through hole (12) and encloses a pump cavity (130). An outlet (14) is defined in the outer periphery of the first casing (10) and communicates with the pump cavity (130). An inlet (15) is defined in the outer periphery of the first casing (10) and communicates with the inside of the first casing (10).

A rotor (20) is mounted in the first casing (10). The rotor (20) includes a sleeve (201), a magnetic shaft (21) and an impeller (22). The magnetic shaft (21) has a longitudinal central hole (23) defined to be fixedly pressed onto the sleeve (201). The impeller (22) is also securely pressed onto the sleeve (201) so that when the magnetic shaft (21) rotates, the impeller (22) will also rotate. When the sleeve (201) is slid onto the positioning axle (11), the impeller will be positioned in the pump cavity (130) of the first casing (10). The impeller (22) includes a neck (220) corresponding to the inlet (15) of the first casing (10). A longitudinal keyed hole (24) is defined in a free end of the sleeve (201). The first casing (10) further includes a cover (16) attached to the flange (13) of the first casing (10) to close the pump cavity (130). A bore (161) is defined in the cover (16) to align with the keyed hole (24) in the free end of the sleeve (111).

A reduction device (30) is engaged to the rotor (20). The reduction device (30) includes a keyed shaft (31) with one end that extends through the bore (161) in the cover (16) and engages to the keyed hole (24) in the rotor (20). A pinion (311) is securely attached to the other end of the keyed shaft (31). The reduction device (30) includes a reduction gear set (301) engaged to and driven by the pinion (311) that is attached to the keyed shaft (31). The reduction gear set (301) includes a final output gear (32) with an output shaft (33) extending out to provide another source of power from the water circulation pump.

A second casing (40) abuts the first casing (10) to cover the reduction device (30). A hole (401) is defined in the second casing (40) through which the output shaft (33) of the reduction device (30) extends. The second casing (40)

includes multiple suction cups (41) attached to the bottom of the second casing (40) to secure the water circulation pump in the aquarium.

Water is sucked into the pump cavity (130) and ejected by the impeller (22) of the rotor (20) into the aquarium from the outlet (14) to form a water current in the aquarium, and the reduction device (30) is driven to provide another source of power when the rotor (20) rotates. The additional power source is provided by the output shaft (33) of the reduction device (30) and could be used to drive a decorative device (50) to make the aquarium looking more vivid and vigorous. The decorative device (50) includes a flexible shaft (51) engaged to the output shaft (33) and a planetary gear set (501) driven by the flexible shaft (51). The planetary gear set (501) includes multiple output gears (not numbered) each having a shaft (not numbered) to drive a decorative plate (52) which are attached to the shaft of the output gear of the planetary gear set (501).

Although the invention has been explained in relation to its preferred embodiment, it is to be understood that many other possible modifications and variations can be made without departing from the spirit and scope of the invention as hereinafter claimed.

What is claimed is:

1. A water circulation pump for an aquarium comprising:

a first casing having a stator device mounted in the first casing, a positioning shaft extending from a first side of said first casing, and a through hole defined in a second side of said first casing, a flange extending outward from said second side of said casing around said through hole and enclosing a pump cavity, an outlet defined in an outer periphery of said first casing and communicating with said pump cavity, and an inlet defined in said outer periphery of said first casing and communicating with an inside of said first casing;

a rotor mounted in said first casing, said rotor including a sleeve, a magnetic shaft and an impeller; wherein said magnetic shaft has a longitudinal hole defined to be securely pressed onto said sleeve, said impeller is also securely pressed onto said sleeve and is received in said pump cavity of said first casing, said impeller including a neck corresponding to said inlet of said first casing, and a keyed hole defined in a free end of said sleeve;

a cover attached to said flange of said first casing to close said pump cavity and having a bore defined to align with said keyed hole in said rotor;

a reduction device engaged to said rotor, said reduction device including a keyed shaft having a first end extending through said bore of said cover and securely received in said keyed hole of said rotor and a second end, a pinion securely attached to said second end of said keyed shaft, said reduction device including a reduction gear set engaged to and driven by said pinion and a final output gear having an output shaft extending outward to provide a source of power adapted to drive a decorative device in said water circulation pump; and a second casing abutting said first casing to cover said reduction device and having a hole defined through which said output shaft of said reduction device extends, and multiple suction cups attached to a bottom of said second casing to secure said water circulation pump on said aquarium.

* * * * *